US00RE41575E

(19) United States
(12) Reissued Patent
Yamamoto

(10) Patent Number: US RE41,575 E
(45) Date of Reissued Patent: Aug. 24, 2010

(54) CRYSTALLINE TURBOSTRATIC BORON NITRIDE POWDER AND METHOD FOR PRODUCING SAME

(76) Inventor: Osamu Yamamoto, 4-1 Oaza Daimon Inuyama, Aichi (JP)

(21) Appl. No.: 10/691,434
(22) Filed: Oct. 23, 2003

Related U.S. Patent Documents

Reissue of:
(64) Patent No.: 6,306,358
Issued: Oct. 23, 2001
Appl. No.: 09/089,018
Filed: Jun. 2, 1998

(51) Int. Cl.
*C01B 21/064* (2006.01)

(52) U.S. Cl. ..... 428/402; 423/290
(58) Field of Classification Search ..... 423/290, 423/402
See application file for complete search history.

(56) References Cited

U.S. PATENT DOCUMENTS

| | | | | | |
|---|---|---|---|---|---|
| 3,241,919 | A | | 3/1966 | O'Connor | |
| 3,607,042 | A | * | 9/1971 | Arber et al. | 423/290 |
| 4,562,050 | A | * | 12/1985 | Koeda et al. | 423/290 |
| 4,749,556 | A | * | 6/1988 | Parrish et al. | 423/290 |
| 4,810,479 | A | * | 3/1989 | Biardeau et al. | 423/290 |
| 5,169,613 | A | * | 12/1992 | Shore et al. | 423/289 |
| 5,230,873 | A | * | 7/1993 | Wildenburg et al. | 423/290 |

FOREIGN PATENT DOCUMENTS

| | | | |
|---|---|---|---|
| JP | B-48-14559 | * | 5/1973 |
| JP | 60-151202 A | | 8/1985 |
| JP | 61-063505 A | | 4/1986 |
| JP | 61-111904 A | | 5/1986 |
| JP | 01-305861 | | 12/1989 |
| JP | 02-044067 | | 2/1990 |
| JP | 02-080308 A | | 3/1990 |
| JP | 02-296706 A | | 12/1990 |
| JP | A-2-296706 | * | 12/1990 |
| JP | B-4-4966 | * | 1/1992 |
| JP | B-5-47483 | * | 7/1993 |
| JP | 05-170406 A | | 7/1993 |
| JP | 05-170407 A | | 7/1993 |
| JP | B-7-53610 | * | 6/1995 |
| JP | A-7-172806 | * | 7/1995 |

OTHER PUBLICATIONS

Hamilton, E. J. et al. (1993). "Preparation of Amorphous Boron Nitride and Its Conversion to a Turbostratic, Tubular Form," *Science*260:659–661. (no month).

Ostrovskaya, N. F. et al. (1996). "Krystallizatsya Nitrida Bora. . . , " *Powder Metallurgy*11/12:68–72. (no month).

Thomas, J. et al. (1963). "Turbostratic Boron Nitride, Thermal Transformation to Ordered–layer–lattice Boron Nitride," *Journal of the American Chemical Society*84(24):4619–4622. (no month).

Partial Translation of Notice of the Grounds for Rejection mailed Jan. 8, 2008, directed to related JP application No. 10–152020; 3 pages.

S. Kurita et al., "Pressureless Sintering of h–BN for Continuous Temperature Measurement of Melts" Shigen–Sozai–Gakkai–Shi(=*J. Resources and Materials Assoc.*) vol. 2 (1989) pp. 201–204.*

* cited by examiner

*Primary Examiner*—Wayne Langel
(74) *Attorney, Agent, or Firm*—Morrison & Foerster LLP

(57) ABSTRACT

Turbostratic boron nitride (t-BN) powder having excellent sinterability. A mixture of boric acid anhydride and urea is charged in a reaction vessel together with alkali-borate, heated step by step in the vessel in an nonoxidizing gas atmosphere of one atmospheric pressure or above, and kept at a temperature from 850° C. to 950° C. to yield an intermediate product formal substantially of an amorphous boron nitride powder (first reaction step). Then the intermediate product is heated and kept at a temperature from 1200° C. to 1400° C. to crystallize crystalline t-BN, and the product is purified by washing with water and aqueous solution to obtain pure crystalline t-BN powder.

20 Claims, 8 Drawing Sheets x20000 x10000

INDICATED MULTIPLICATION FACTOR x $\frac{2}{3}$

PARTICLE SIZE μm

MEDIAN SIZE = 0.304 μm
SPECIFIC SURFACE=234287cm$^2$/cm$^3$

PARTICLE SIZE: 1.00 μm=95.2%
%PARTICLE SIZE: 90.0 %=0.747 μm x20000 x10000

INDICATED MULTIPLICATION FACTOR x $\frac{2}{3}$ x20000 x10000

INDICATED MULTIPLICATION FACTOR x $\frac{2}{3}$

CRYSTALLINE TURBOSTRATIC BORON NITRIDE POWDER AND METHOD FOR PRODUCING SAME

Matter enclosed in heavy brackets [ ] appears in the original patent but forms no part of this reissue specification; matter printed in italics indicates the additions made by reissue.

FIELD OF THE INVENTION

The present invention relates to a boron nitride powder, especially to high purity turbostratic boron nitride powder having good sinterability and a method for producing same which enables mass scale production of the boron nitride powder in low cost.

GENERAL BACKGROUND OF THE INVENTION

There are several kinds of polymorphs in boron nitride They are hexagonal boron nitride (hereinafter h-BN), rhombohedral boron nitride (hereinafter r-BN), amorphous boron nitride (hereinafter a-BN), turbostratic boron nitride (hereinafter t-BN), zinc blend type cubic boron nitride (hereinafter c-BN), and wurtzite type hexagonal boron nitride (hereinafter w-BN), the latter two being high pressure stable phases. In case where boron nitride is synthesized at relatively low temperatures, for example at 900° C. or below, a-BN is generated. It is known that if boron nitride synthesis is carried out at elevated temperature or if a-BN is heat treated at elevated temperature, h-BN is generated. The primary particles of h-BN powder are usually hexagonal platelets.

FIG. 1 is X-ray powder diffraction diagram of h-BN which exhibits remarkable [002], [100], [101], [102] and [004] diffraction spectra. Compared with this h-BN diffraction diagram, the diffraction diagram of a-BN generally exhibits a broad diffraction peak having a large half peak height width at the site where the [002], [100] and [101] diffraction peaks of h-BN are present. As shown in FIG. 8 the broad diffraction peak seems to be a composite of the [100] and [101] diffraction peaks of h-BN (hereinafter, for convenience of explanation, every diffraction peaks of boron nitride other than h-BN in respective X-ray powder diffraction diagrams are simply named with indexes of h-BN without notices). The crystal of h-BN has a crystal structure having hexagonal B-N net layers stacked up in a pattern of a,a', a,a', a,a', a,a', . . . With other typed patterns of stacked hexagonal B-N mesh layers, other kinds of crystal phases other than h-BN will result, and a crystal phase having a random manner of stacked hexagonal B-N mesh layers is generally called t-BN.

In a wide sense, as explained in "Shigen-Sozai-Gakkai-Shi (J. Resources and Materials Association)" Vol. 105 No. 2, p 201, a-BN may be classified as one sort of BN having a turbostratic structure. However, a boron nitride having such broad X-ray diffraction peaks should be amorphous BN, i.e., a-BN. In the present invention, a well crystallized boron nitride, having sharp and remarkable [004] and other diffraction peaks in the X-ray powder diffraction diagram, is termed "t-BN". (Particularly, as explained later, the present invention intends a crystal phase having a specified small half peak height width of the [004] spectra 2θ and having no ordering (pattern) in the laminating manner, as the crystalline t-BN).

Boron nitride crystals have crystal structures similar to graphite and exhibit properties similar to graphite crystals except for electrical insulating property. For example, boron nitride crystals have weak bonding strength between each hexagonal B-N mesh layers, and are easily cleaved into flakes to exhibit solid lubricity. Boron nitride is stable up to high temperatures under a nonoxidizing atmosphere, hard to sinter, with its sintered body having good machinability. Yet more, it is not oxidized up to about 1000 ° C., which is by about 500 ° C. higher than the oxidation resistant temperature of graphite. Boron nitride has attractive properties as a material. If boron nitride powder having superior sinterability or high purity is produced cheaply and sintered bodies can be supplied in low cost, boron nitride will find many new applications which are not economically feasible at present.

RELATED ART

As methods for producing boron nitride, the following methods have been known.

(1) Heating a mixture of borax and urea in an atmosphere of ammonia (Japanese Patent Kokai publication JP-A-38-1610).

(2) Heat treating a mixture of boric acid or ammonium borate with nitrogen source material such as urea, ammonia, melamine, dicyandiamide etc. (Japanese Patent Kokoku publications JP-B-48-14559, JP-B-5-47483, Japanese Patent Kokai publication JP-A-7-172806, J. Am. Chem. Soc. Vol. 84. p 4619–4622, 1963).

(3) Heat treating boron powder in atmosphere of nitrogen and ammonia (Japanese Patent Kokoku publication JP-B-7-53610).

(4) Synthesize boron nitride by vapor reaction of boron chloride and ammonia under reduced pressure (Japanese Patent Kokoku publication JP-B-2-296706).

(5) Thermal decomposition of borazine or borazine derivatives (Japanese Patent Kokoku publication JP-B-4-4996).

(6) Boron nitride powder obtained by heat treating a mixture of urea and boric acid in ammonia is reported to have a turbostratic structure which is similar to turbostratic graphite structure (J. Am. Chem. Soc. Vol. 84. p 4619–4622, 1963).

SUMMARY OF THE DISCLOSURE

In the course of development toward the present invention, we encountered the following problems in the prior art:

It is disclosed that the product powder obtained by method (1) at a low temperature is a-BN, whereas if the synthesis is carried out at elevated temperatures, h-BN powder is obtained. The resultant boron nitride powders contain plenty of sodium ingredient and are not suited for electrical insulator applications. According to method (2), it is disclosed that a-BN results at synthesizing temperature below 1000° C., although the product obtained by synthesizing at higher temperatures is h-BN because boric acid promotes crystallization of h-BN. The product includes almost no impurities other than boric acid, but it is a problem from the view point of present invention that h-BN is apt to be produced because of coexisting boric acid.

As for method (3) or (5), cost of such starting materials as boron powder, borazine and borazine derivatives is expensive, entailing a high cost of produced boron nitride. Method (4) lacks in productivity and generates hydrogen chloride which is corrosive and has stimulus odor. To secure working environment, it necessitates expensive equipment to trap the hydorogen chloride. None of these reports mentions production of crystalline t-BN powder.

On the other hand from the view point of the present invention, method (6) explains only that a-BN powders exhibit two broad (i.e., with a large half peak height width) peaks, namely, a [002] diffraction peak at the [002] site of h-BN and a [10] diffraction peak at a site around the [100] and [101] sites of h-BN, respectively, while exhibits no [004] diffraction peak in the X-ray powder diffraction diagram(refer to FIG. 1A). It is reported that the transformation from t-BN to h-BN begins when heated up to 1450° C., and is completed to about 1850° C. As the transformation (crystallization) proceeds, partial three dimensional ordering of atoms will occur (refer to FIG. 1. B, C) and finally get to perfect three dimensional ordering of the hexagonal system. In the case of this method, impurity of boron oxide remaining in the resultant boron nitride powder is inevitable.

As explained above, in the known methods of prior art, there is no known method which is suited for the mass production of the crystalline t-BN powder, particularly crystalline t-BN powder having a higher extent crystallization.

It is a principal object of the present invention to provide a new crystalline t-BN powder.

In detail, it is further objects of the present invention to provide a solution for the above mentioned problems in the prior art and to provide a low cost boron nitride powder easy to sinter, especially a crystalline t-BN powder, and a novel method for mass-producing the crystalline t-BN powder.

In another aspect, it is a still further object of the present invention to provide a high purity crystalline t-BN powder.

Also it is a yet further object to provide a novel t-BN powder having a narrow particle size distribution range (preferably, allowing to control the mean particle size of at most one μm to a size of far below one micron, i.e., ranging to super-submicrons).

According to a first aspect of the present invention, there is provided a method for producing a crystalline turbostratic boron nitride (t-BN) powder. The method comprises a step of crystallizing a substantially amorphous boron nitride (a-BN) powder into a crystalline turbostratic boron nitride (t-BN) powder under coexistence of an effective amount of fused alkali-borate as a fluxing agent in a non-oxidizing atmosphere (hereinafter referred to as "crystalline t-BN crystallization step" or "secondary reaction step"), within a vessel of a closed state or quasi-closed state.

In general, the crystallization of boron nitride means transformation of boron nitride into the three dimensionally ordered orientation of boron nitride crystals. In the present invention, the t-BN crystallization means conversion to the crystalline t-BN, which includes (i) gradual development of two dimensional boron nitride hexagonal nets (or mesh) layer, (ii) enhanced parallel orientation between layers although remaining random stacking of the hexagonal nets layers with respect to the rotational position in the layer plane producing a laminated structure reaching a constant distance between neighboring nets layers, which is crystallization of the crystalline t-BN.

The crystallization step of the crystalline t-BN is preferably carried out at 150° C. or below for a time enough until crystallization of the crystalline t-BN proceeds substantially. More preferably, this crystallization is carried out at a temperature from 1200° C. to 1400° C. Further, preferable starting material of the secondary reaction step will be explained later, but it is not limited to such materials and any kinds of a-BN may be used. Also, use of a-BN of an intermediate state that is partially crystallized to t-BN or use of seeds of the crystalline t-BN is also possible.

According to the second aspect, the present invention provides a method for producing a t-BN powder, wherein the method comprises a step of heating a starting mixture including a boron source material and a nitrogen source material and reacting them to synthesize a substantially amorphous boron nitride powder in an atmosphere of the atmospheric pressure or higher, within a vessel of closed state or a quasi-closed state (hereinafter preferred to as "the first reaction step" or "boron nitride synthesis step"). By keeping the reaction atmosphere at or above the atmospheric pressure, the reaction will be promoted. To obtain high purity crystalline t-BN, addition of alkali-borate can be very small or even omitted. The reaction product of the first reaction step can be subjected to the crystalline t-BN crystallization process without washing the reaction product. The first reaction step is carried out by heating to a temperature below 1200° C., preferably by heating up to a temperature of 950° C. or below.

According to a third aspect of the present invention there is provided a method for producing a crystalline t-BN powder, wherein the method includes a step of heating a mixture containing boron oxide or a material which yields boron oxide upon heating as a boron source material, a nitrogen source material and an effective amount of coexisting alkali-borate as a fluxing agent in a nonoxidizing atmosphere within a vessel of closed or quasi-closed state and reacting them to synthesize substantially a-BN powder.

As the nitrogen source material, urea is preferred. Alkali-borate can be hydrated one, and sodium borate or the hydrate can be used. The first reaction step is preferably carried out by heating at least up to the melting point of the fluxing agent and below 1200° C. More preferably, heating is performed up to a temperature of from 850° C. to 950° C.

In the second or the third aspect, the atmosphere of the first reaction step can be composed mainly of decomposed gasses generated from the starting mixture during the first reaction step. The first reaction step can be carried out without evacuating generated gasses and the non-oxidizing atmosphere can be kept at the atmospheric pressure or above including a slightly higher pressure than the atmospheric pressure. Also in the second or the third aspect, the atomic ratio of nitrogen to boron (N/B) between the nitrogen source material and the boron source material can be nitrogen rich (excess of nitrogen). And the N/B ratio is preferably 1.01 or above, more preferably 1.5 or above,and much more preferably 2.0 or above. For example,the weight ratio of urea to boron oxide (urea/boron oxide) is preferably 1.5 or above, more preferably 2.0 or above, and most preferably the weight ratio is from 6/4 to 9/4 (atomic N/B ratio of from 1.75 to 2.6).

Further in the crystalline t-BN crystallization step (secondary step), the nitrogen source material may be additionally supplied to the mixture or additional heating may be applied, too. These procedures contribute to generate the nitrogen atmosphere or to complete the reaction of the boron source material with the nitrogen source material.

It is preferred for promoting the first reaction step to adjust the concentration of alkali-borate in the mixture from 0.01% or above, and 20% or below by weight, more preferably from 0.1% to 15% by weight, most preferably from 1% to 10% by weight. If high purity boron nitride is desired, it is preferable to omit addition of alkali-borate. In this case, the reaction conditions such as pressure of atmosphere, atomic N/B ratio of the mixture etc., should be optimized.

Further, it is preferred to comprise the crystalline t-BN crystalization step in which the product of the first reaction step is held at a temperature of 1500° C. or below, more preferably at 1450° C. or below, most preferably at a temperature of from 1200° C. to 1400° C. It is a merit of the present invention that the reaction product of the first reaction step can be subjected to the second reaction step without washing or purification and this procedure is in other sense very preferable.

Also, it is preferred to smash the product of first reaction step before subjected the product to the second reaction step. However, it is also possible to carry out the second reaction step continuously subsequent to the first reaction step.

After the crystalline t-BN crystallization step, the produced crystalline t-BN powder can be washed with a solvent such as water or acidic water to remove residues or impurities such as alkali-borate. It is a large merit that the final product can be purified by washing with water. In the first reaction step, it is preferred to use a vessel of closed or a quasi-closed state loaded with the starting mixture and to heat the vessel gradually and/or step by step. In this case, the first reaction step can proceed even during heating up. Further, in the first reaction step, it is preferred to add a small amount of crystalline t-BN powder to the mixture of boron source material, nitrogen source material and alkali-borate as seed crystals followed by heating the mixture to start the first reaction step. With this procedure, the reaction efficiency or yield rate is increased.

In a forth aspect of the present invention, a crystalline t-BN powder is provided, produced by any one of methods described in the first, second or third aspect. As an example of the forth aspect, the crystalline t-BN powder is produced by a method including a step of heating a mixture containing boron oxide or a material which can be changed into boron oxide upon heating as a boron source material and a nitrogen source material including urea in a non-oxidizing atmosphere (including an atmosphere generated within a vessel of a closed or quasi-closed state) to cause reaction (the first reaction step) generating a precursor of crystalline t-BN, and a step of heating the reaction products of the first reaction step in a nonoxidizing atmosphere to crystallise crystalline t-BN (the second reaction step).

As another variation of the forth invention, a crystalline t-BN powder is produced by a method in which the aforementioned first reaction step is carried out by heating a starting mixture of the first step containing no alkali-borate in an atmosphere of the atmospheric pressure or above the atmospheric pressure which includes atmosphere formed in a vessel of a closed or quasi-closed state and followed by the second reaction step.

As a variation of the forth aspect, a crystalline t-BN powder is provided, which exhibits X-ray diffraction spectra in the Cu Kα X-ray powder diffraction diagram corresponding to the [004] diffraction spectra of h-BN powder having a half height width of 0.6° or below in 2θ, more preferably 0.5° or below, much more preferably 0.47° or below. Obtainable is a crystalline t-BN powder that exhibits further diffraction peaks which correspond to [002], [004] and [100] diffraction peaks of h-BN, and instead of the [101] diffraction peak of h-BN, exhibits [10] diffraction peak which is peculiar to amorphous t-BN at the larger angle site continuous to [100] diffraction peak as a continuously sloped down diffraction spectrum, provided that it exhibits no diffraction peak which corresponds to the [102] diffraction peak of h-BN.

It is preferred that the crystalline t-BN powder exhibits specific X-ray diffraction spectra in which the diffraction intensity (as represented by peak area S[100], S[101] and S[102]) of three diffraction peaks corresponding to [100], [101] and [102] diffraction peaks of h-BN have a relation represented by an equation:

$$S[102]/(S[100]+S[101])\leqq 0.02$$

(This means that the crystalline t-BN powder does not substantially include h-BN powder). And typically obtainable is a crystalline t-BN powder having a diffraction peak, in the Cu Kα X-ray powder diffraction diagram which corresponds to the [004] diffraction peak of h-BN at 55°±3°. Such X-ray powder diffraction diagram corresponds to that of high purity crystalline t-BN powder. Generally we can obtain crystalline t-BN powders with a purity of 99% by weight or above, preferably of 99.5% by weight or above, more preferably 99.8% by weight or above.

In a fifth aspect of the present invention, there is provided a crystalline t-BN powder having a uniform primary particle size, typically a powder with a primary particle size of 3 μm or below, and the primary particles of the crystalline t-BN powder has an average particle size of 1 μm or below. The majority of primary particles of the crystalline t-BN powder have nearly spherical shapes and/or nearly disklike shapes. With a small size, the particle assumes a roughly spherical shape, while with a grown crystal it assumes a roughly disklike shape. Further, we can obtain a crystalline t-BN powder with primary particles having an average particle size of 0.1 μm or below.

Typically, 90% by weight or more of primary particles of the crystalline t-BN powder are in a size range from ½ D to 2 D where D represents the average particle size of the primary particles. The crystalline t-BN powder has a specific surface area of 20 $m^2/g$ or above as measured by gas adsorption method. We can obtain a crystalline t-BN powder which is substantially free of boron oxide as far as it is identifiable in the X-ray powder diffraction diagram.

Also we can obtain a crystalline t-BN powder which does not exhibit any diffraction peak, in the CuK α X-ray powder diffraction diagram, which corresponds to the [102] diffraction peak of h-BN. We can obtain a crystalline t-BN powder exhibiting a diffraction peak [10], in the X-ray powder diffraction diagram, which appears around the sites of diffraction peaks [100] and [101] of h-BN as a combined peak thereof and exhibits no recognizable diffraction peak which corresponds to the [101] diffraction peak of h-BN.

In a sixth aspect, there is provided an a-BN containing powder, which exhibits specific X-ray powder diffraction spectra having a broad bulged peak having a dull mountainous shape, without a clear, sharp peak shape, at the site corresponding to the diffraction peak [004] of h-BN, and which is characterized by the following feature: Namely, when the a-BN containing powder is heat treated in a non-oxidizing atmosphere at a temperature of from 1200° C. to 1400° C., the a-BN containing powder crystallizes and transforms into a crystalline t-BN powder, and when the crystalline t-BN powder is examined with the X-ray powder diffraction by Cu Kα-ray, a diffraction peak corresponding to the [004] diffraction peak of h-BN has a half height width of 0.6 or below in 2θ, and intensities of diffraction corresponding to the [100], [101] and [102] diffraction peaks of h-BN as represented in terms of the peak area, S[100], S[101] and S[102] have a relation expressed by an equation:

$$S[102]/(S[100]+S[101])\leqq 0.02.$$

In a seventh aspect of the present invention, there is provided a boron nitride powder, in which particles of the boron nitride powder are coated with coating layers containing alkali-borate. Preferably, the coating layers are mainly composed of alkali-borate. This boron nitride powder is an intermediate product of the total reaction step, as a product of the first reaction step and a starting material of the second reaction steps. The coated boron nitride powder particles are most suited as a material for crystallizing the crystalline t-BN. The boron nitride powder may be amorphous one.

However, the powder can preferably contain particles of crystalline t-BN, especially as seed crystals. The seed crystals are preferably crystalline t-BN crystals, but may be imperfect crystalline t-BN crystals.

The meritorious effects of the present invention are briefly summarized as follows. According to the present invention, we can mass produce a crystalline t-BN powder cheaply in commercial scale, which is not amorphous one, but well crystallized and pure one (particularly of monophase). The crystalline t-BN powder is only one commercialy producible crystalline t-BN powder at present and is useful as t-BN powder itself, for making a sintered body and a raw material of other ceramic material. The pressed body made of the crystalline t-BN powder has a large density and easy to be sintered. And sintered bodies of a high relative density and a high bending strength are obtainable. As it is possible to control (or reduce) the purity level ($B_2O_3$ or oxygen impurity) of the powder, suitable crystalline t-BN powders for various applications can be provided at desire. As this crystalline t-BN powder can be mass produced cheaply, new applications can be realized which are not formerly feasible because of economical reasons. Sintered boron nitride body of excellent properties can find many industrial applications. The method of the present invention is very useful as an industrial production method of excellent boron nitride powders. With the first reaction step of the present invention, a-BN containing powder which is useful as a precursor of boron nitride, especially of boron t-BN, can be produced effectively. The first reaction step is promoted with high efficiency when it is carried out especially under a gas atmosphere of one atmospheric pressure or above. Compared with common reduced pressure employed in the prior art, this gas atmosphere can realize a remarkable breakthrough. The a-BN containing powder can be converted to crystalline t-BN powder, especially specified one, with a high yield. The reaction product of the first reaction step is not only useful by itself but also as a starting material of boron nitride polymorphs including crystalline t-BN and h-BN, and also of other complex ceramic materials. From now there is provided a basis for wide variety of applications.

The addition of alkali-borate as fluxing agent is expected to have a main role as inhibiting oxidation, and by restraining crystal growth, functions as a catalyser for crystallizing or assisting formation of fine crystalline t-BN. In other words, it prohibits transformation to h-BN. Moreover, it contributes to improve purity by giving easy washability. Yet more, according to the present invention, it is also possible to provide a still higher purity and finer crystalline t-BN powder by ensuring homogeneous primary particle sizes without utilizing fluxing agent. This is an amazing effect of the present invention.

BRIEF DESCRIPTIONS OF THE DRAWINGS

DETAILED DESCRIPTION OF THE PREFERRED EMBODIMENTS

Figure 1:
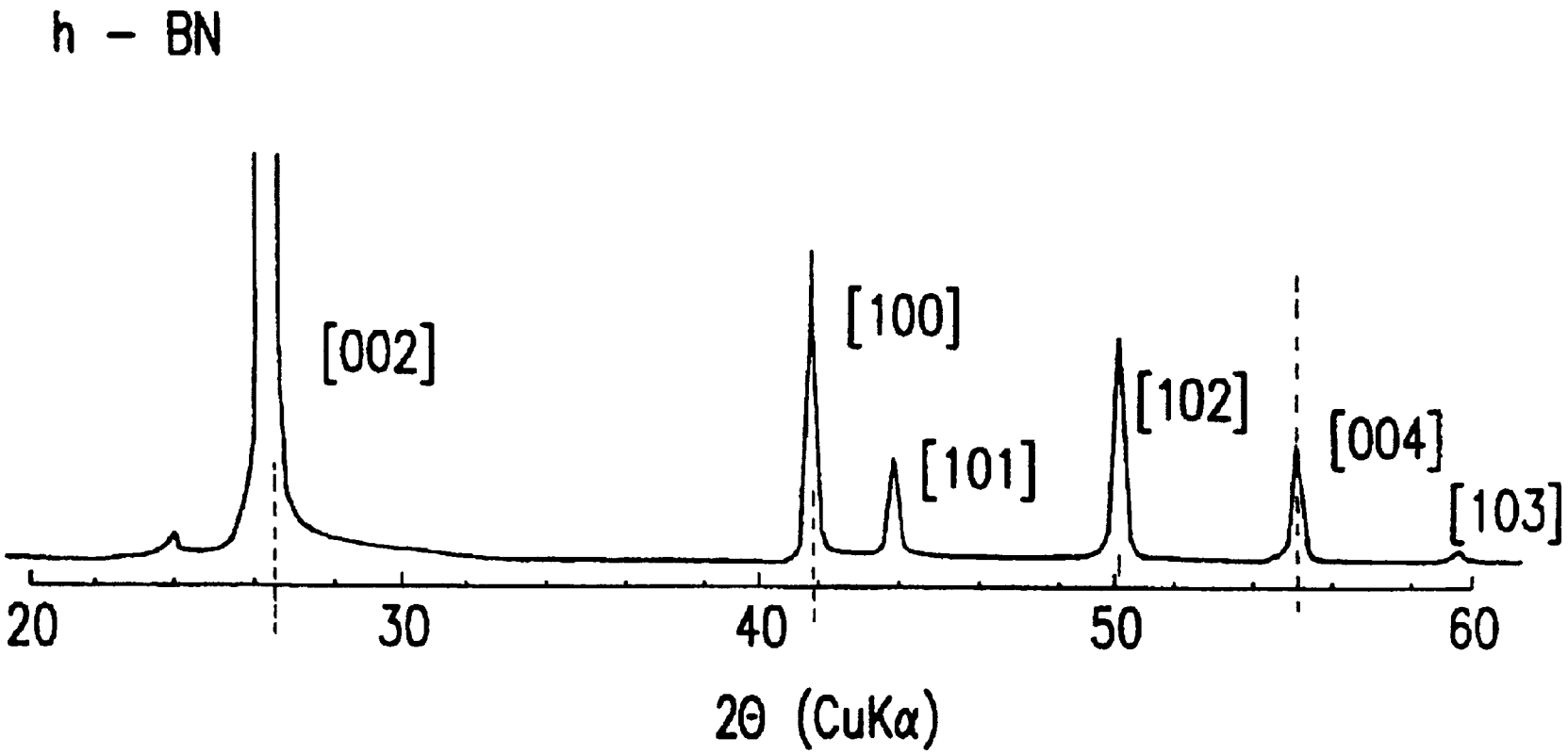
FIG. 1 shows an example of a known X-ray powder diffraction diagram of h-BN powder according to prior art.

In the first and the second aspect, the method for producing crystalline t-BN powder preferably comprises a step of heating a mixture of boric acid (or boric acid anhydride) as a boron source material, a nitrogen source material (especially urea) and alkali-borate (as a fluxing agent) in a vessel of non-oxidizing atmosphere (at atmospheric pressure or above) with a closed lid. The reaction step is preferably carried out by heating up to a temperature of 950° C. or below (especially when the mixture contains the fluxing agent, up to the melting point of the fluxing agent, preferably from 850° C. to 950° C.) and let substantially amorphous type boron nitride. (especially as a precursor of crystalline t-BN) be synthesized. The nitrogen source material can be a nitrogen compound with at least one element of carbon, hydrogen and oxygen. The nitrogen source material is preferably urea which melts upon heating and reacts at a high efficiency. As the boron source material, it is preferred to adopt boron oxide from the viewpoints of reactivity, cost and safety. Those starting materials may be hydrates.

Boric acid is produced from such natural borate as borax by mixing with sulfuric acid, and boric acid is precipitated by utilizing the small solubility in water. Boric acid anhydride (or boron oxide) can be obtained by heating to dehydrate boric acid and is also a cheap material. The melting point of boric acid anhydride is 460° C. It is easy to obtain high purity urea, because urea is made directly from ammonia and carbon dioxide gas. Urea is a cheap material as can be utilized as fertilizer and melts at 135° C.

In the present invention the term boric acid includes any type of boric acid which can be dehydrated to boric acid anhydride by heating. When boric acid is used instead of boric acid anhydride, it reacts like boric acid anhydride on heating. For the fluxing agent, an alkali-borate such as lithium borate, sodium borate and potassium borate can be used. Among these alkali-borate, sodium borate is preferred, because it is cheap and easy to remove by washing. Many alkali-borates usually include crystal water, however, are converted to anhydrides on heating and melting at relatively low temperatures to vitrify. When the starting mixture includes an alkali-borate, a-BN which is easily crystallized into crystalline t-BN is synthesized and the presence of alkali-borate accelates the crystallization of a-BN into crystalline t-BN.

Alkali-borates such as borax ($Na_2B_4O_7 \cdot 10H_2O$) will dehydrate to anhydrides 200° C. or above, for example from 350° C. to 400° C., and melt at temperatures from 741° C. to 878° C. Both boron source material and nitrogen source material may be materials of low melting temperatures, the starting mixture will be in a molten state on heating and as the temperature rises, reacts to release such gasses as water vapor and carbon dioxide, and results in a dry flaky state. Since these released gasses are not poisonous and nonflammable, the production equipment can be constructed simply. During the reaction, the atmosphere in the reaction vessel is substituted and filled with the released gasses, and if the vessel is kept in a closed or quasi-closed state to prevent flow of air into the vessel, the pressure level inside the vessel will be kept above the atmospheric pressure or at a pressurized state as it is. From the viewpoint of safety and cost of the vessel, it is preferred to keep the pressure level inside the vessel at a pressure a little higher than the atmospheric pressure (for example 1.01 atm. or above) by releasing the released gasses through a release valve. The pressure of the vessel can be controlled to any pressure which is preferable for achieving an objective reaction. There is no limit as to the pressure of the reaction vessel, but from the view point of feasible pressure and the manufacturing cost of reaction vessel, it is preferable to adopt a reaction pressure of 2.5 kg/cm$^2$ or below. In case of using no fluxing agent, a high reaction pressure is preferred for promoting reactions.

Heating in the first reaction step is carried out preferably at 450° C. or above, more preferably at 500° C. or above, or at 600° C. or above and below 1200° C., more preferably at 1050° C. or below, at 1000° C. or below (much more preferably from 800° C. to 950° C., or from 880° C. to 920° C., the most preferably at about 900° C.). As the first reaction step it proceeds efficiently at 950° C. or below, it is preferable to keep the reaction temperature at or above the melting point of the fluxing agent in the temperature range. By keeping the reaction temperature at or above the melting point of the fluxing agent, the molten flux will coat each synthesized particles of a-BN powder (uniformly depending on the amount thereof). When there is sufficient amount of fluxing agent, each synthesized particles of a-BN will be present as dispersed particles in the matrix of fluxing agent.

To crystallize the reaction product of the first reaction step (or the precursor of crystalline t-BN powder) into the crystalline t-BN powder, the reaction product is heat treated at a t-BN crystallization temperature. The t-BN crystallization step is carried out under the reaction condition that at a temperature of 1500° C. or below, substantially no h-BN is synthesized (including the period and the atmosphere of the reaction). More preferably, the mass can be held at 1450° C., or below, in a regular nonoxidizing atmosphere (preferably in nitrogen atmosphere), especially at a temperature of 1200° C. to 1400° C. (much more preferably of 1250° C. to 1380° C., or further 1300° C. to 1350° C., and preferably in a closed or quasi-closed state vessel), until a predetermined level to t-BN crystallization (and a desired crystal grain size) is achieved. During this t-BN crystallization, remaining material of the starting mixture prevents crystallization to h-BN and efficient crystallization of crystalline t-BN is provided. The reasons of preferential crystallization of the crystalline t-BN are not clear yet, but it has turned out that one of the reasons resides in the existence of alkali-borate. If alkali-borate is not used, it is preferred to proceed sufficient synthesis of a-BN and sufficient crystallization of crystalline t-BN, and careful washing will contribute to high purity of the crystalline t-BN. The washing is preferably done using an acidic water solution, not only by pure water, especially it is preferred to use an acidic water solution of a volatile acid such as hydrogen chloride. To remove remaining boric oxide effectively from the processed material of the second reaction step, a hot water solution is used and finally rinsed with hot pure water. After the crystallization step of crystalline t-BN, the reaction product or the crystallized powder is subjected to washing with a water solution to remove remaining extra ingredients such as alkali-borate, and pure refined crystalline t-BN powder is obtained. During this washing procedure, nonreacted remaining boron oxide is removed too, and it is possible to control the concentration of remaining boron compound (or boron oxide) to a low level.

As an example of the forth aspect, a specific crystalline t-BN powder is provided through a method which includes a step of heating a mixture containing boron oxide or boron oxide anhydride and urea in an atmosphere of the atmospheric pressure or in a pressurized atmosphere above the atmospheric pressure (particularly an atmosphere formed in a closed or quasi-closed vessel) to cause reactions (the first reaction step) and a step of heating the reaction products of the first reaction step in a nitrogen atmosphere to crystallize the crystalline t-BN. This crystalline t-BN powder preferably exhibits Cu Kα X-ray powder diffraction spectra having a diffraction peak, which corresponds to the [004] diffraction of h-BN, with a half peak height width of 0.6° or below in 2θ (more preferably 0.5° or less, typically 0.47° or less in 2θ) and can be distinguished from nearly amorphous t-BN (a-BN) powder and low crystalline t-BN powder. In the X-ray powder diffraction diagram of a-BN powder, [004] diffraction peak is not a sharp one but a bulged out broad one with a half peak height width of 0.7° or above in 2θ (for example 1° and 1.5° in 2θ) is known. Namely, a small half peak height width or sharpness of specific X-ray diffraction peak means high cristallinity of the examined powder material, in other words, each particles of the powder has reached sufficiently crystallized crystals. Further, a crystalline t-BN powder with diffraction peak intensities of three diffraction peaks, in the Cu Kα X-ray powder diffraction diagram, which correspond to [100], [101] and [102] diffraction peaks of h-BN as represented by peak area, S[100], S[101] and S[102] have a relation represented by an equation:

$$S[\mathbf{102}]/(S[\mathbf{100}]+S[\mathbf{101}])\leqq 0.02.$$

Fulfillment of the relation represented by this equation means that the crystalline t-BN powder contains substantially no h-BN particles, or even if any a very small amount of h-BN particles are included. In the X-ray diffraction diagram of the crystalline t-BN powder having a structure of randomly stacked hexagonal boron nitride layers, there should be no peak which corresponds to the [102] diffraction peak of h-BN, whereas the presence of [102] diffraction peak would suggest inclusion of boron nitride crystals other than crystalline t-BN such as h-BN. However, in case where there are absent of diffraction peaks other than the [102] diffraction peak peculiar to h-BN in the X-ray powder diffraction diagram, the boron nitride powder might partially have a psuedo-h-BN structure which is a modified typed crystalline t-BN.

In the sixth aspect, there is provided a crystalline t-BN powder with homogeneous or sharp primary particle size distribution (nearly equal size). The particle sizes of primary particles can be controlled mainly by controlling purity, heating temperature and period of the second reaction step (the t-BN crystallization step). To evaluate submicron sized primary particles precisely, SEM is a potential tool. When the heating of the second reaction step is carried out below 1300° C., the average primary particle size of resultant crystalline t-BN powder will be below 0.1 μm, at 1300° C. from 0.2 μm to 0.3 μm, at 1350° C. 1 μm or below. As examples of minimum sized primary particles of crystalline t-BN powder, averaged primary particle sizes from 0.01 μm to 0.02 μm, 0.05 μm or below and from 0.07 to 0.08 are also possible. As examples of large sized primary particle sizes of crystalline t-BN powders, average primary particle sizes from 3 μm to 4 μm (at 1400° C.) is also possible. Heating at higher temperatures brings about partial generation of h-BN, though it is still possible to obtain a crystalline t-BN powder with the majority of the entire particles being crystalline t-BN. Further, by controlling as explained above, crystalline t-BN powder having a desired average primary particle size is obtainable.

The second reaction step is carried out typically in non-oxidizing atmosphere such as nitrogen (atmospheric pressure is preferred) by keeping the intermediate product at a temperature from 1200° C. to 1400° C. for about 2 hours. As an example, about 10 hours of heating up is made from the room temperature to a predetermined heat treating temperature (for example 1300° C.). The heat treating period (holding time) is generally 10 minutes or longer, preferably from 30 minutes to 10 hours, possibly for 1 hour, 2 hours or longer, depending upon the level of desired primary particle sizes and the crystallinity of aimed crystalline t-BN powder. During the heating, such nitrogen source material as urea can be supplied for providing nitrogen atmosphere and at the same time for further nitriding remaining unreacted boron oxide. With this procedure, purity and yield rate of the crystalline t-BN can be improved. Of course, the second reaction step can be carried out continuously after the first reaction step. But it is preferable for obtaining homogeneous crystalline t-BN powder to disintegrate or crush the product of the first reaction step before subjecting the product to the crystalline t-BN crystallization steps.

In the seventh aspect, as explained above, a-BN powder which is a precursor of crystalline t-BN powder is obtainable. This powder is obtained as a product of the first reaction step (intermediate product) and contains alkali-borate. The powder particles of a-BN are at least partially coated with alkali-borate fluxing agent, or dispersed in surrounding alkali-borate fluxing agent. In this invention, numerical range represents arbitrary all numerical values in the scale of one tenth of represented numerical values including lower limit, upper limit and numerical values between the lower limit and the upper limit (or below the upper limit or above the lower limit). The expression of omitting intermediate numerical values is aimed at simplicity of description only.

The mixing amount of alkali-borate is calculated to share a part of boron source for boron nitride synthesis and a role to promote the crystallization of a-BN into crystalline t-BN. For promoting this purpose, the amount of alkali-borate is preferably 0.01% by weight (more preferably 0.1%, or 0.5% by weight) or above based on the weight without crystal water. However, a large excess amount of alkali-borate is not so effective for promoting crystallization of crystalline t-BN, and a long time washing process with a plenty of pure water will be required for purifying the produced crystalline t-BN powder. The mixing concentration of alkali-borate in the mixture is preferably 20% by weight or below (more preferably 15%, 10% or 5% by weight or below) and can be adjusted within above explained concentration range.

If very high purity crystalline t-BN is aimed, alkali-borate can be omitted, and taking removing losses of non-reacted material into account, it is advantageous to carry out the first reaction step without adding fluxing agent. In this case, as mentioned above, the reaction is promoted by controlling the reaction conditions. Namely, it is possible by increasing heating temperature or reacting pressure of the first reaction step. Further, even without fluxing agent, the second reaction step can be achieved by controlling temperature. Further, by washing with hot water, especially additional washing with hot acidic water, a high purity crystalline t-BN can be provided finally.

We can use any reaction vessel which is durable to such reaction temperature and pressure, and as a reaction vessel for use at 950° C. or below, a cheap normal steel vessel or stainless steel reaction vessel is recommended. The nonoxidizing atmosphere can be formed by blocking oxygen flow in or by keeping a slightly pressurized state above the atmospheric pressure with by produced steam, through controlling the flow of steam blowing out of the reaction vessel. The slightly pressurized state above the atmospheric pressure includes a state that does not allow any flow of air into the reaction vessel. Because it is possible to completely shut out oxygen to flow in to promote the first reaction step. The pressure is preferably from 1.01 to 2.5 atm., more preferably from 1.05 to 2.0 atm. As the first reaction step can proceed with a considerable speed even not exceeding 2.5 atm., it is preferred to keep it at 2.5 atm. or below. However, as a matter of course, more higher pressure than 2.5 atm. can be employed. The main reaction which is supposed to occur during the first reaction step will be:

$$B_2O_3+CO\ (NH_2)_2 \rightarrow 2BN+CO_2+H_2O$$

Most of the alkali-borate in the mixture is supposed to remain as it is.

To effectively react boron ingredients charged in the vessel, it is preferable to charge nitrogen ingredients to bring the N/B atomic ratio in excess of nitrogen more preferably in considerably extreme exess. The N/B atomic ratio is preferably 1.1 or above. In the weight ratio of urea to anhydrous boric acid ($CO(NH_2)_2/B_2O_3$), from 6/4 to 9/4 (correspond to N/B atomic ratio of from 1.75 to 2.6). Generally, 10 weight % exess of nitrogen as compared with the theoretically required quantity is sufficient. However, when alkali-borate is absent, this ratio N/B is preferably higher than these recommended ratio, and the ratio N/B is preferably at 2.0 or above, more preferably 2.3 or above, most preferably about 2.6±0.2.

The intermediate material taken out of the reaction vessel after the first reaction steps is a-BN powder which is constituted of particles covered with alkali-borate or other remaining products except alkali-borate. For example, a-BN powder coated with sodium salt is a flaky or calamel like material and is bulky. It is preferable to improve packing density of the intermediate material by smashing or disintegrating it For example, the intermediate material is reduced to particles of 1 mm or below. This procedure makes final purification step of the boron t-BN powder easy.

Next, the intermediate product of a-BN powder containing alkali-salt (or no alkali-salt) is subjected to the second reaction step to yield crystalline t-BN by heat treating at a temperature and condition that promotes t-BN crystallization without crystallization into h-BN. This temperature is selected at most at 1500° C. so as not to crystallize h-BN, and preferably from 1200 to 1400° C., more preferably from 1250 to 1350° C. This temperature is variable with respect to amounts of allowable remaining boron oxide (or oxygen), aimed purity and particle sizes of intermediate product (the temperature may be generally controlled to keep) for a period by an interval per 10 minutes to hour. Generally the total period of heating up and holding treatment is preferably at least one hour, but can be 10 hours or longer, sometimes from 12 hours to 13 hours or 16 hours or longer to fully complete crystallization of crystalline t-BN. When the heat treating temperature is selected in the temperature range from 1450 to 1500° C., where the crystallization of h-BN is possible, it is preferable to pay full attention to the heat treating period (sometimes it should be controlled per minute).

For heat treating the intermediate product, vessel or container of refractory material which is durable to the heat treating temperature is used. The vessels are preferably made of steel or such ceramics as alumina, mullite and cordierite, however so-called sagger in general may be used, too. The atmosphere is preferably a nonoxidizing atmosphere or can be an atmosphere shut out of oxygen in the air. It is preferably to pay attention so as not to let oxygen flow into the vessels during the period of the heat treating by keeping the vessels in the closed or quasi-closed state. The crystallization temperature of a-BN to crystalline t-BN is much more preferably in a temperature range from 1280 to 1350° C. The heat treating temperature is preferably 1200° C. or above to complete the crystalline t-BN crystallization step within a feasible period. But high temperature heat treatment at above 1450° C. gives an opportunity of co-crystallization of h-BN with crystalline t-BN and the heat treating is preferably made at 1450° C. or below, more preferably at 1300±10° C.

The second reaction step is preferably carried out in such an atmosphere as nitrogen allowing no contact with oxygen in the air, so as to reduce the oxygen content (or the $B_2O_3$ residue) of the crystalline t-BN powder. When the intermediate product is a a-BN powder of particles covered with alkali-borate, it is possible to obtain a crystalline t-BN powder of a low oxygen content by heat treating the intermediate product in lidded containers of closed or quasi-closed state which can restrain oxygen flow in to some extent. The intermediate product accommodated in lidded containers is inserted into a crystallization furnace such as an electric furnace together with the lidded containers and subjected to heat treatment. When the period of heat treatment is short, crystallization of crystalline t-BN will not complete. Generally, the heat treatment period is sufficient to complete in about 10 hours, but can be adjusted properly with respect to the heat treating temperature. The heat treatment with a period of 10 hours or longer, for example from 12 to 13 hours or about 16 hours, is sufficient to bring about sufficient crystallization of crystalline t-BN. The final stage of the heat treatment is keeping at the maximum temperature for a certain period (for example for 10 minutes or longer, preferably from 30 minutes or longer, or one to 2 hours). It is also a preferred way of the second reaction step to raise the heating temperature step by step or gradually (e.g., through 10 hours) up to the maximum temperature, then the remaining boron oxide will be promoted to react.

The crystallization-completed product of crystalline t-BN contains impurities of non-reacted materials and alkali-borate such as sodium borate, and preferably subjected to purification by washing with an aqueous washing solution. In the prior art, the washing of boron nitride powder was done with alcohol such as ethanol so as not to let oxygen be taken in the product powder through reaction with water. However, the crystalline t-BN powder of the present invention is so stable and insensible to oxygen that washing with water increases oxygen content but little. Thus washing with inexpensive water can purify the t-BN. Since the purity of washing water influences the purity of purified crystalline t-BN powder, it is preferred to use distilled pure water or ion-exchanged pure water. The completeness level of washing can be checked with pH value of used water. By using warmed water for washing, solubility of boron oxide and alkali-salt are increased as the temperature rises and washing can be completed promptly. The temperature of washing water is preferably as high as possible such that does not bring any adverse effect on the synthesized crystalline t-BN powder (for example it is preferably from 80 to 85° C. For the washing the water, acid water including volatile acid such as hydrogen chloride or organic acid can be used and pure crystalline t-BN powder can be obtained.

Figure 4:
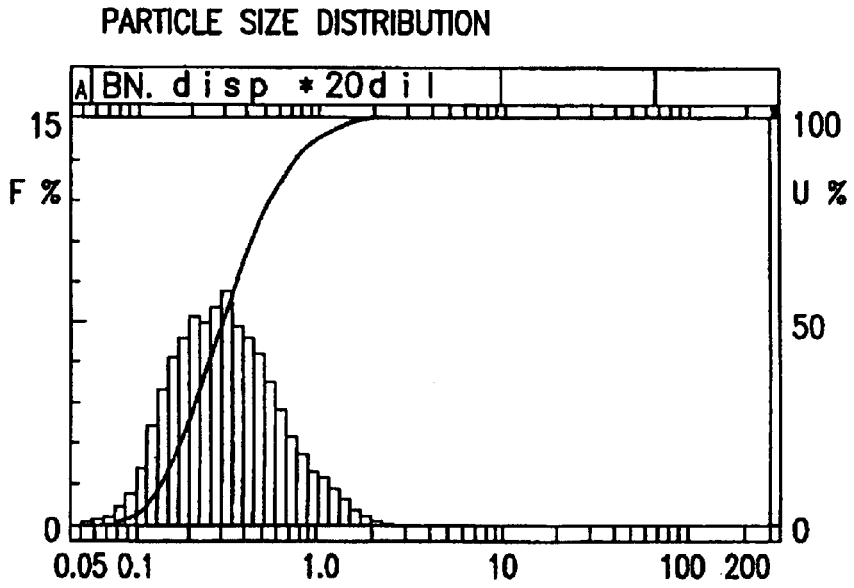
FIG. 4 shows an example of particle size distribution obtained on a crystalline t-BN powder according to one embodiment of present invention.

The purified boron nitride powder washed as explained above is a high purity crystalline t-BN powder, constituted of very fine primary particles, substantially all of particle sizes are preferably from 3 to 4 μm or below. The average size of primary particles of the crystalline t-BN powder are preferably 1 μm or below, more preferably 0.5 μm or below, much more preferably 0.3 μm or below. Further the average primary particle size can be 0.2 m or below, further can be 0.1 μm or below. The obtained powder of crystalline t-BN is constituted of very fine primary particles and exist as secondary particles, thus it is difficult to evaluate the particle size distribution with sedimentation method. The particle size distribution can be evaluated by taking an electron microscope photograph of primary particles dispersed in a liquid and analyzed based on images in the print. FIG. 4 shows an example of a particle size distribution of obtained crystalline t-BN powder analyzed by Horiba particle size analyzer, Type LA-700, which shows a median particle diameter of 0.3 μm, an accumulated particle size of 1 μm and below is 95.2% by weight, and an accumulated particle size at 90% by weight being 0.75 μm. However, it is believed that this powder contains a substantial amount of secondary particles, the actual primary particle size distribution must be finer than that shown in FIG. 4. The average primary particle size of primary crystalline t-BN can be calculated based on the Scherrer equation (refer to J. Am. Chem. Soc. Vol. 84. p 4620, 1963) from half height width of a diffraction peak in the X-ray powder diffraction diagram. This average primary particle size is given as La in the a-axis direction and as Lc in the c-axis direction of t-BN crystals.

This average primary particle size almost coincides with the average primary particle size obtained by analyzing the primary particle images in the photograph taken by electron microscope. The primary particle size distribution of the crystalline t-BN powder obtained by the present invention is very sharp and the majority of primary particles of the powder distribute with in an arrow particle size range, as shown in FIG. 4 which is a particle size distribution and in FIG. 3, FIG. 5 and FIG. 6 which are pictures of crystalline t-BN powders taken with a scanning elecrton microscope. The crystalline t-BN powder can be obtained as a variety of powders having narrow particle size distribution, for example 95% by weight of particles are in a particle size range of from 0.3 μm to 1.0 μm, 1.0 μm or below, from 0.02 μm to 0.07 μm, or from 0.2 μm to 0.6 μm etc., respectively.

In a preferred method of producing the crystalline t-BN powder according to the present invention, the first reaction step is carried out by elevating the reaction temperature gradually and/or step by step (e.g., in 3 or more stages). For example, with a method of charging the starting mixture in plurality of batch type vessels, and moving each vessel from a heating unit of a lower temperature to the next heating unit of a higher temperature, it is possible to synthesize a-BN semi-continually in high efficiency and multi-station flow type processing can be constructed. The a-BN powder synthesized with this method is easy to be crystallized to a crystalline t-BN powder of the present invention.

In a preferred embodiment of producing the crystalline t-BN powder according to the present invention, the method contains a step of adding a small amount of t-BN fine crystal powder as seeding crystals to the starting mixture. The small amount of t-BN fine crystal powder promotes crystallization of crystalline t-BN and a high purity crystalline t-BN powder is obtained speedily in a high yield. If the amount of seeding crystals is too small, the promoting effect is also small, and the amount of seed crystals to be added is preferably 0.1% by weight or above, but an excess addition of seeding crystals is not effective. Thus the preferable amount of seeding crystals is 3% by weight or below, more preferably from 0.2 to 1% by weight. The seeding crystals may be imperfect crystals and the intermediate product can be also used. We can use the product of the second reaction step (possibly the product of the first reaction step) as it is or as crushed or washed state. The recycling of any intermediate stage products to the first or the second reaction step is effective to increase the final yield rate.

When the crystalline t-BN powder of the present invention is analyzed with the Cu Kα X-ray powder diffraction, we can find a strong diffraction peak which corresponds to the [004] diffraction peak of h-BN. Though the presence of the strong diffraction peak means that the powder is constituted of well crystallized crystal particles and the half peak height width of the diffraction is so small as 0.6° in 2θ or below (typically 0.47° or below), the diffraction peak which corresponds to the [102] diffraction of h-BN is absent or very small, even if any. These are characteristic features peculiar to the pure crystalline t-BN powder.

Figure 3:
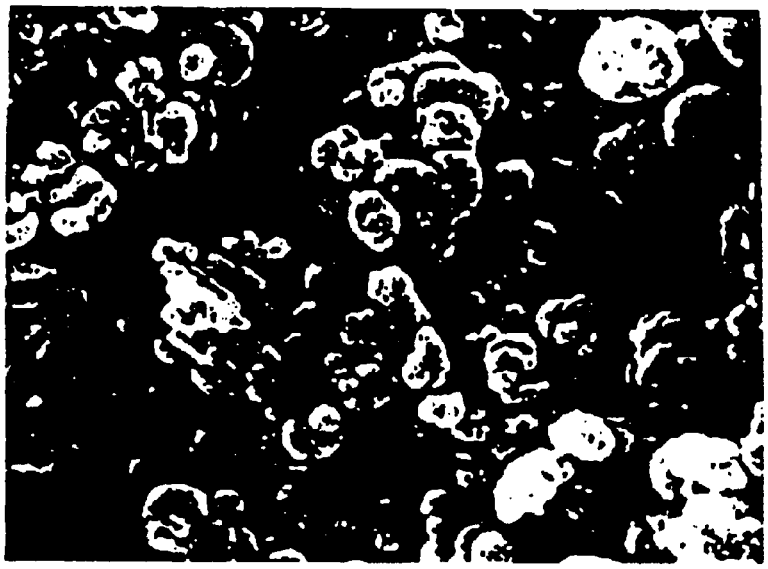
FIG. 3 shows SEM photomicrographs showing example of crystal particles of a crystalline t-BN powder according to the present invention. The magnifications are ×20,000 and ×10,000 respectively, with a representation magnitude of ×⅔.
Figure 3:
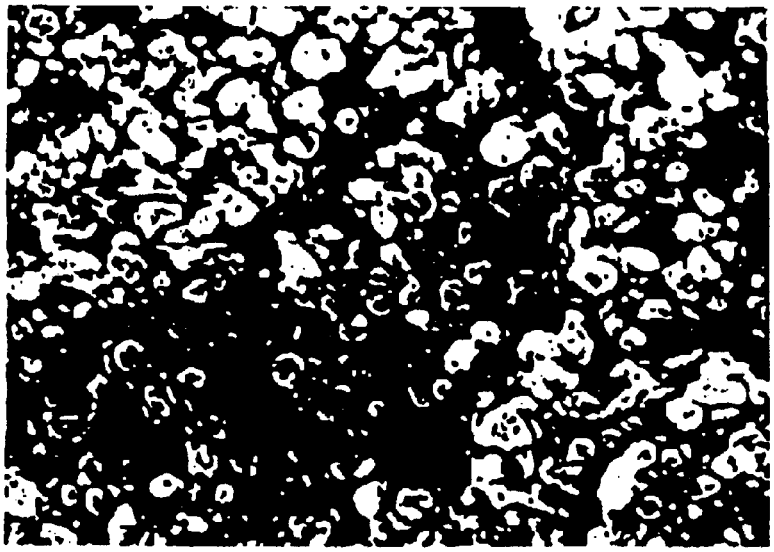
Figure 5:
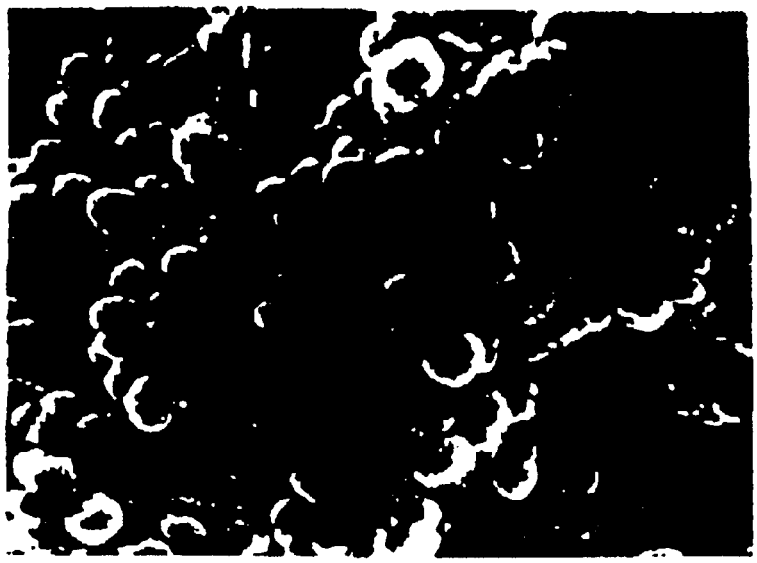
FIG. 5 represents SEM photomicrographs showing another example of crystal particles of a crystalline t-BN powder according to the present invention. The magnifications are ×20,000 and ×10,000 respectively, with a representation magnitude of ×⅔.
Figure 5:
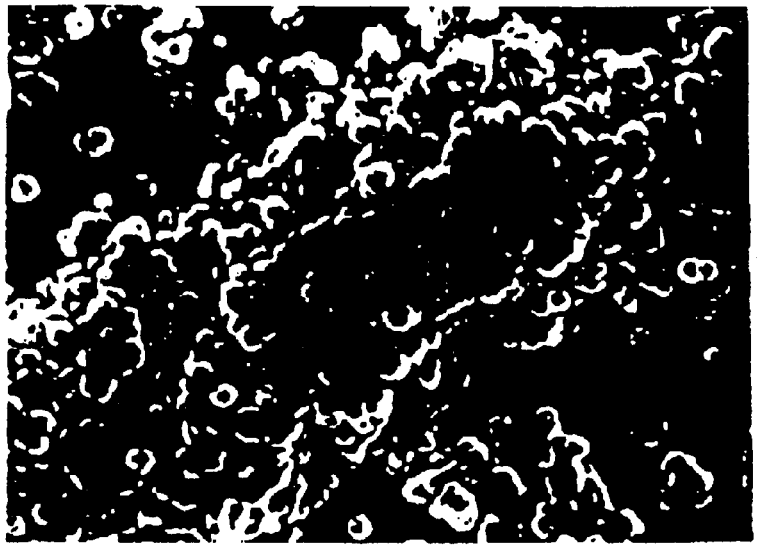
Figure 6:
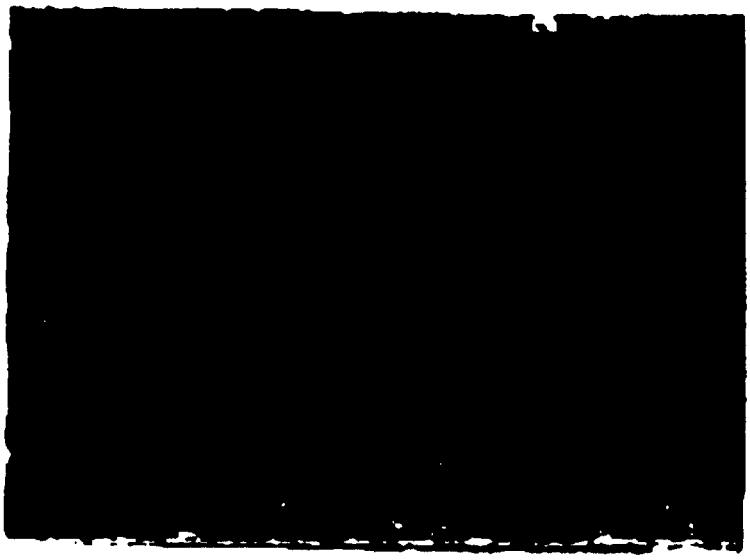
FIG. 6 shows SEM photomicrographs showing another example of crystal particles of a crystalline t-BN powder synthesized without addition of fluxing agent according to the present invention. The magnification are ×20,000 and ×10,000 respectively, with a representation magnitude of ×⅔.
Figure 6:
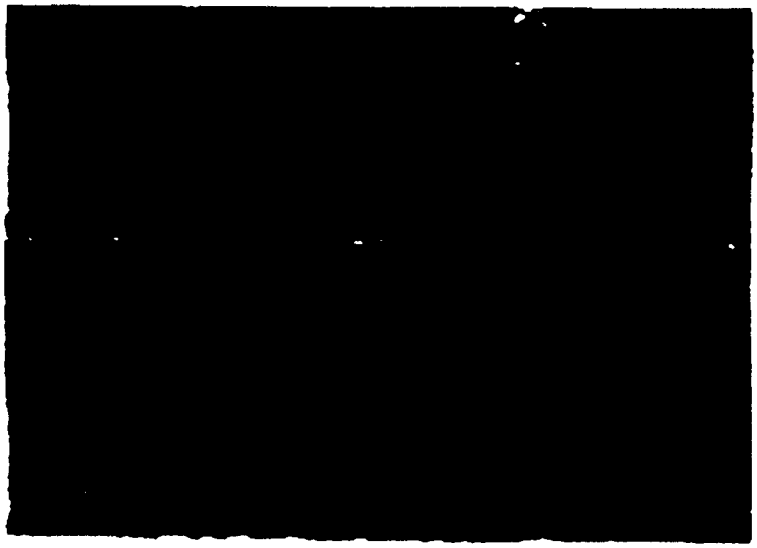

The fact that the examined boron nitride powder shows a sharp X-ray diffraction peak which corresponds to the [002] diffraction peak of h-BN and the half height width of the diffraction peak is 0.6° in 2θ or below, means that the diffraction is composed of well crystallized crystalline t-BN. In the case of h-BN powder, each crystal particle has a shape of hexagonal platelets as illustrated in FIG. 3. In contrast, in the case of preferable crystalline t-BN powder, each crystal particle has a shape of circular platelet (in case of a large size) or, when the particles are small, a nearly spherical shape as illustrated in FIGS. 3, 5 and 6. The shape of crystalline particles originates from the crystal structure of t-BN crystals in which there is no orientation in the a-axis direction parallel to hexagonal B-N nets. The crystalline t-BN powder of the present invention preferably has the [002] diffraction peak in the Cu Kα X-ray powder diffraction diagram with a half peak height width of 0.5° or below in 2θ. According to the conditions to be adopted with the first reaction step and the second reaction step, the value of half diffraction peak height width is controllable, which is a merit of the present invention.

In the crystalline t-BN powder of the present invention, the crystalline t-BN powder shows three diffraction peaks in the Cu Kα X-ray powder diffraction diagram which correspond to [100], [101] and [102] diffraction peaks of h-BN, and the diffraction peak intensities of each peak represented by peak area, S[100], S[101] and S[102] have a relation represented by an equation:

$$S[102]/(S[100]+S[101])\leqq 0.02.$$

The presence of the [102] diffraction peak means the presence of order (or orientation) in the stacking manner of hexagonal B-N nets. Thus the above equation suggests that there is no order or almost no order in the stacking manner of the hexagonal B-N nets in the crystalline t-BN crystals (no order with respect to mutual positions in the sliding directions (parallel to the plane) and rotating angles between neighboring B-N net layers), namely, turbostratic crystalline structure.

The peak areas S[102], S[100] and S[101] can be measured with a planimeter, or by measuring the weight of each peak shaped papers cut out along the profile of each peaks found above the base line in the X-ray powder diffraction diagram with a precise balance. The calculated value of S[102]/(S[100]+S[101]) is preferably 0.01 or below. If the S[102] value is very small, the diffraction peak which corresponds to the [102] diffraction of h-BN is not recognized in the X-ray powder diffraction diagram (refer to FIGS. 2 and 7).

In the crystalline t-BN powder of the present invention, the oxygen content in the crystalline t-BN powder can be small, and we can obtain crystalline t-BN powder having at least no diffraction peak which can be attributed to the presence of boron oxide in the X-ray powder diffraction diagram. The purity of obtainable crystalline t-BN powder is 99.0% by weight or above, preferably from 99.5 to 99.8% by weight, more preferably 99.9% by weight or above. The crystalline t-BN powder of low oxygen content is excellent in sinterability, can be pressed to high bulk density and can be sintered with small sintering shrinkage, and it is easy to obtain sintered body of precise dimensions. From the other point of view, high purity monophased crystalline t-BN powder is an attractive material for developing various applications by fully utilizing the peculiar properties.

Specific surface area of the obtainable crystalline t-BN powder as measured by gas adsorption method is preferably 20 $m^2/g$ or above, more preferably from 23 to 25 $m^2/g$.

Further, in the seventh aspect, there is provided a substantially amorphous boron nitride (a-BN) powder (or composition). By heat treating the a-BN powder at a temperature from 1200° C. to 1400° C. or crystallization of crystalline t-BN, this a-BN powder is characterized to be able to be crystallized to the crystalline t-BN powder with high yield and high efficiency. This composition is typically obtained as a product of the first reaction step and characterized to contain the specified a-BN powder. It is also possible to obtain a purified intermediate product by washing the intermediate product, which directly includes the reaction product and in some case alkali-borate. This fact, in another aspect proves the usefulness of the first reaction step, itself, recycling, adding seed crystals or repeating the first reaction step contribute to improve the yield rate of the crystallinet-BN powder and enables to control particle sizes. Further to this, the product of the first reaction step itself is useful as a precursor of the crystalline t-BN powder, the product itself can be used as a starting material of another crystalline boron nitride, complex compound (or sintered body) and also useful as starting materials of composite ceramics.

EXAMPLES

Examples of present invention are explained below. But these examples are only a part of many possible embodiments and the present invention is not limited to these examples.

Example 1

3.5 kg of anhydrous boric acid ($B_2O_3$), 5.3 kg of urea ($CO(NH_2)_2$) and 0.63 g of borax ($Na_2B_4O_7 \cdot 10H_2O$) were mixed and used as a starting material. This mixture was charged in a lidded reaction vessel made of stainless steel having dimensions of 530 mm in diameter. This reaction vessel was then inserted in a furnace and heated step by step.

Namely at each temperature range from 250 to 500° C. from 500 to 600° C. from 700 to 800° C. and from 800 to 900° C., heating was carried out for 10 minutes, respectively, and kept at 900±10° C. for 10 minutes (total heat treating period is about one hour). When the temperature reached at about 100° C. steam started to blow out, at 200° C. the mixture partly melted and continued to release gas as foams and bubbles to discharge mainly vapor until 300–400° C. When it was kept at 900° C. for 10 minutes, the releasing rate of blow gas decreased. After the reaction vessel was cooled off the reaction product was taken out of the vessel. At this time, the reaction product was in the dried state of a foamy calamel indicating that almost all of anhydrous boric acid was reacted. Then the reaction product was crushed in the vessel and taken out of the vessel utilizing vacuum cleaner. The reaction product was put to a crusher to pulverize to a powder of particles sized below 1 mm (the first reaction step). This pulverized powder is used as a starting material of the second reaction step.

The pulverized powder was charged in a container made of ceramic (alumina) with a lid put on, and together with the container, the powder was loaded in an electric furnace. Nitrogen gas or carbon dioxide gas was introduced into the electric furnace to keep the atmosphere of the furnace non-oxidizing. Then heating was carried to raise the temperature up to 1300° C. in 10 hours kept at about 1300° C. for 2 hours and cooled off.

The powder was taken out of the steel container and put into ion exchanged hot water of a temperature between 80 and 85° C., stirred enough to remove alkali component, washed with diluted hydrochloric acid to neutralize alkali component. After washing with ion-exchanged water, the powder was dried. The weight of dried crystalline t-BN powder was about from 0.60 kg to 0.65 kg per 1.0 kg of the starting material of the second step. The weight of obtained purified crystalline t-BN powder is about 28.55% by weight based upon the weight of boron in the starting mixture of the first step. The total yield of crystalline t-BN powder is so high as 70% or above with respect to the weight of the starting mixture and the powder was very pure too. There was a weight loss of 10% to 20% by weight between the intermediate product of the first reaction step and the end of crystallization step (second step).

Example 2

Figure 2:
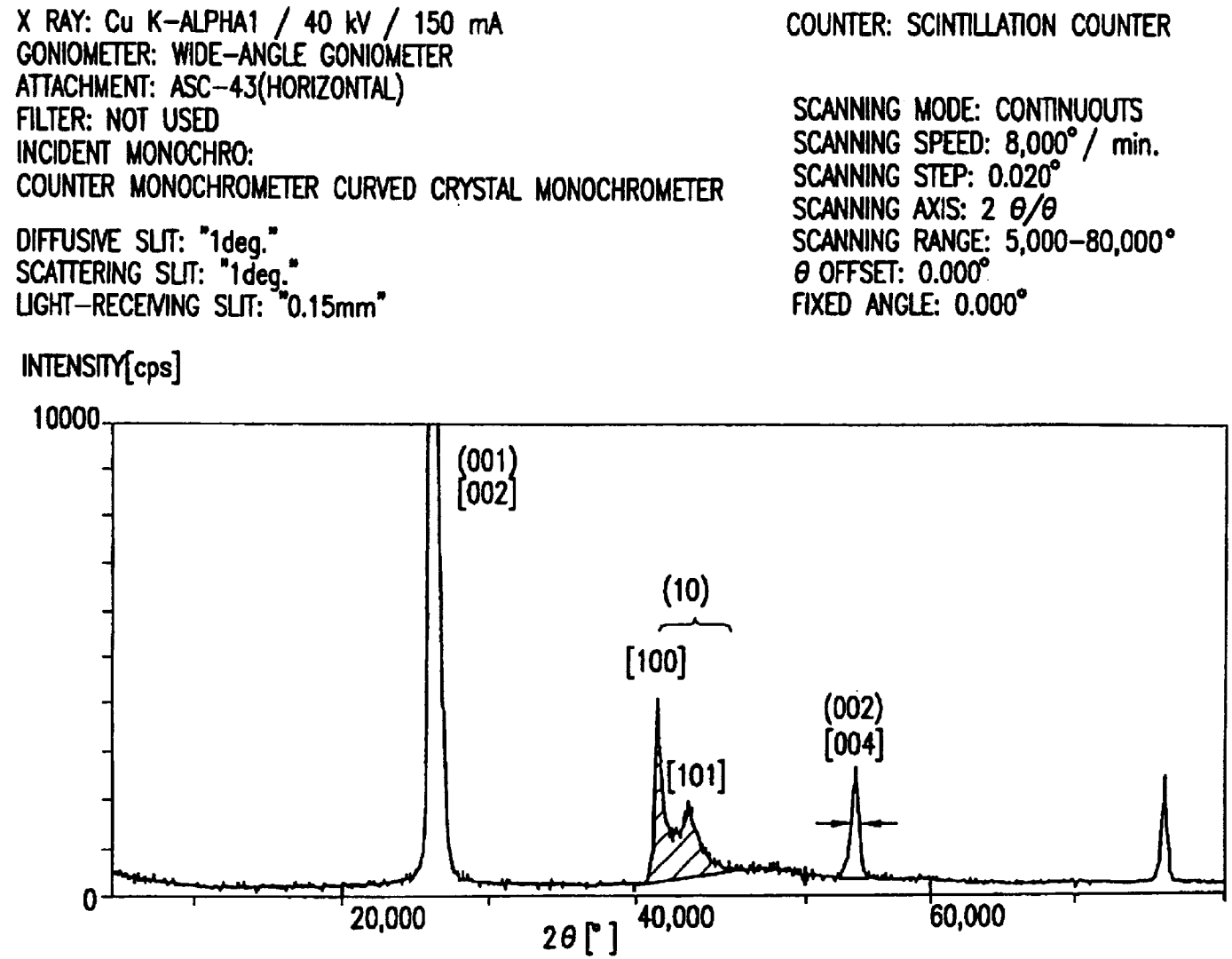
FIG. 2 shows an example of an X-ray powder diffraction diagram of a crystalline t-BN powder according to the present invention. Indices in[] represent indices represented by that of h-BN and indices in () represent indices of t-BN.

Obtained crystalline t-BN powder of another batch as processed using substantially the same conditions as example 1 was analyzed by the Cu Kα X-ray powder diffraction. The obtained diffraction diagram is shown in FIG. 2. By comparing the diffraction diagram of the crystalline t-BN with that of h-BN powder shown in FIG. 1, the boron nitride of FIG. 2 is extensively crystallized t-BN and exhibits sharp diffraction peaks at about 26.6° and about 55° in 2θ which correspond to the sites of [002] and [004] diffraction peaks of the h-BN powder. However, there is no diffraction peak at the site where the sharp [102] diffraction peak of h-BN exists. Further, there is a considerably sharp diffraction peak at 41.55° in 2θ which corresponds to the site of the [100] diffraction peak of h-BN. The foot of the [100]diffraction peak overlaps with the low [101] diffraction peak at the high angle side where the sharp [101] peak of h-BN exists, and the [101] diffraction peak has a wide foot at the higher angle side entailing a slightly elevated background. This [101] diffraction peak is not a sharp one. These facts suggest that the synthesized boron nitride powder is highly crystallized pure t-BN powder. The boron nitride powder as shown in FIG. 2 is an example of the crystalline t-BN powder of the present invention.

Diffraction peak angles in 2θ and half peak height width of the diffraction peaks in the X-ray powder diffraction diagram shown in FIG. 2 were measured. It is found that the [002] diffraction peak is at 26.58°, and the [004] diffraction peak is at 55.0° in 2θ and has a half peak height width of 0.47°.

Example 3

Magnified picture of obtained crystalline t-BN powder of another batch as processed using the same conditions with example 1 is shown in FIG. 3 which are SEM photographs in magnification of ×20,000 and ×10,000 respectively. From pictures of FIG. 3, it is found that the average primary particle diameter of the examined crystalline t-BN powder is about 0.45 μm and particle sizes of the crystalline t-BN powder exists substantially within a range from 0.3 μm to 0.75 μm. The primary particles of the crystalline t-BN powder have different particle shapes which are circular platelets (large one) or nearly spherical particles with respect to small particles, in contrast to that of h-BN powder having the primary particle shape of hexagonal platelets.

Example 4

A crystalline t-BN powder was produced through processes which are substantially the same with example 1, except for adding, as seed crystalites, 1% by weight of crystalline t-BN powder containing a lot of dispersed primary particles to the starting mixture. In this example, the first reaction was enhanced, and the final yield rate of powder t-BN powder was improved remarkably. Further, the actual effective yield rate of crystalline t-BN powder based upon the amounts of anhydrous boric acid in the charged starting mixture reached 80% or above.

Example 5

A crystalline t-BN powder, produced through processes the same as example 1, was dispersed to measure the particle size distribution. The result obtained using HORIBA LA-100 particle size analyser is shown in FIG. 4. The results were as follows: 0.30 μm in median diameter, 95.2% by weight in weight of accumulated particles at 1.0 μm, and 90% by weight in weight of accumulated particles at 0.75 μm. As the crystalline t-BN powder is not dispersed completely, the measured t-BN powder includes many secondary particles and the average diameter of the primary particles of the crystalline t-BN powder must be below 0.3 μm. The specific surface area of the crystalline t-BN powder was 23.4 $m^2/cm^3$. SEM photograph of another crystalline t-BN powder produced by the same conditions with the example 1 is shown in FIG. 5. From the SEM photograph of FIG. 5, it is recognizable that the primary particles have shapes of circular disclike platelets or nearly spherical particles having an average primary particle size of about 0.3 μm and their sizes are in a very narrow particle size range of from 0.2 to 0.45 μm.

Example 6

Mixture of anhydrous boric acid and urea in a weight ratio of 4:9 without addition of borax was charged in a reaction vessel. The mixture was subjected to the first reaction step of one hour, finally kept at from 920° C. to 950° C. for 15 minutes. Thereby the release valve of the vessel was throttled to let gasses leak only a little and the vessel is kept pressurized. Another processing condition adopted including the second reaction step were the same with example 1.

We obtained a very pure crystalline t-BN powder. SEM photograph of the obtained powder is shown in FIG. 6. The shapes of primary particles of the crystalline t-BN powder are nearly spherical, and the average primary particle size is about 0.25 μm, and majority particle sizes of the powder are in a range from 0.15 to 0.38 μm (or approximately from 0.1 to 0.4 μm). The ratio of anhydrous boric acid and urea is preferably from 4:6 to 4:9, and a ratio of about 4:9 gave the best result.

Example 7

Figure 7:
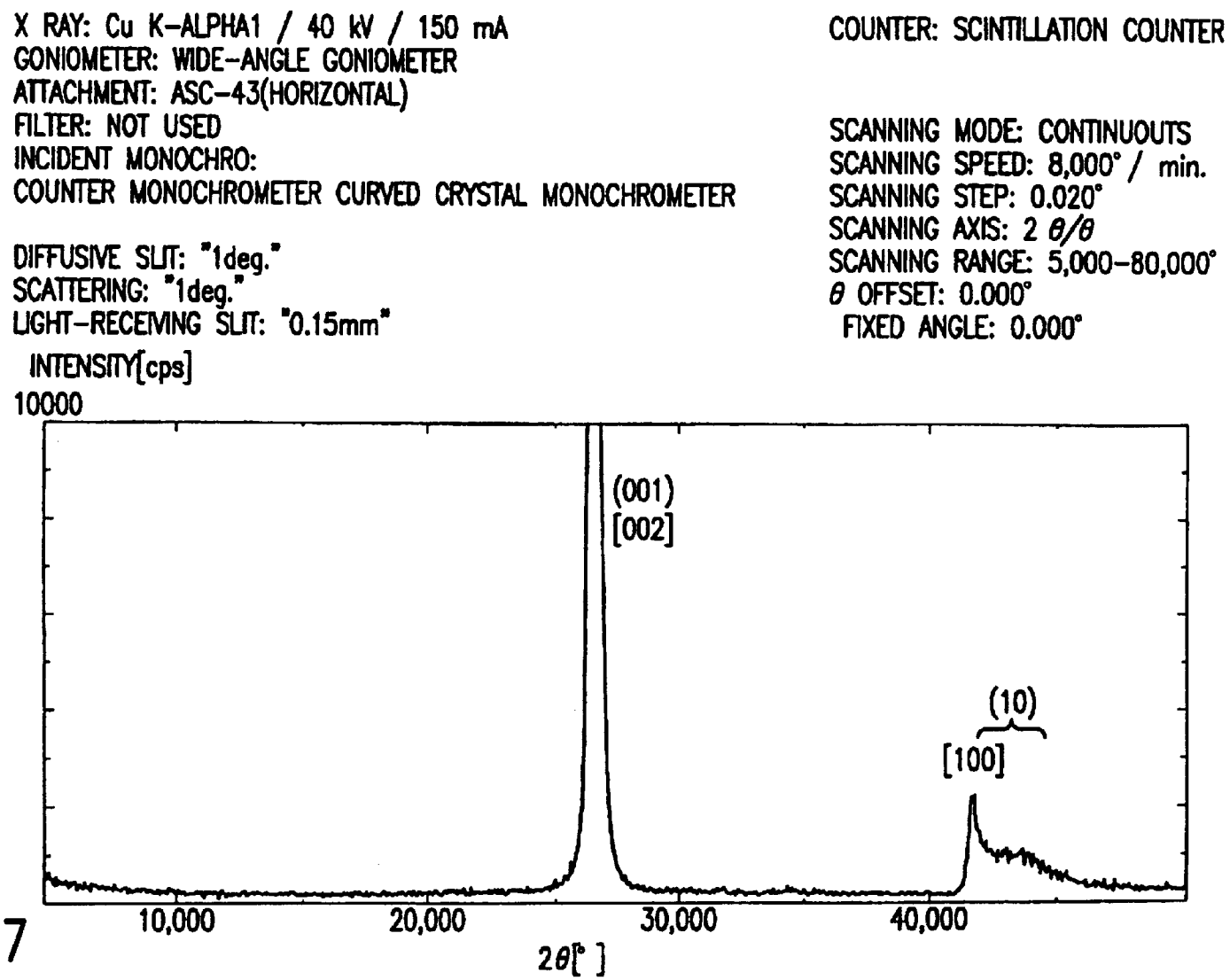
FIG. 7 shows a further example of a X-ray powder diffraction diagram of a crystalline t-BN powder according to the present invention. Indices in [ ] represent indices represented by that of h-BN and indices in () represent indices of t-BN.
Figure 8:
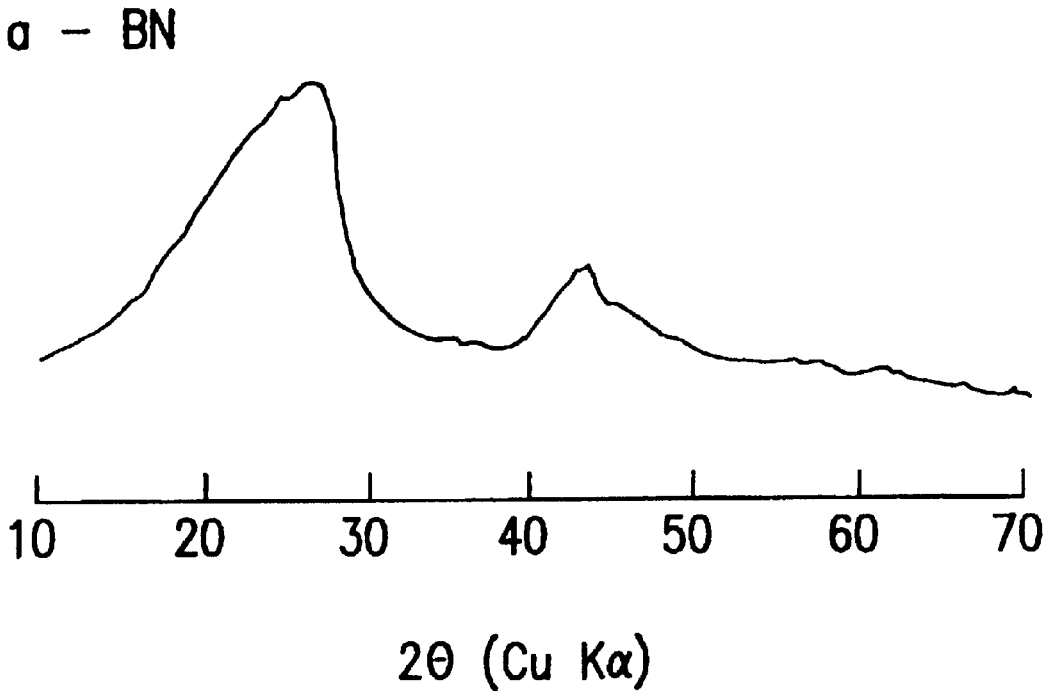
FIG. 8 shows an example of an X-ray powder diffraction diagram of a-BN powder according to prior art.

A crystalline t-BN powder was synthesized utilizing the same processing conditions with example 6, and the X-ray powder diffraction diagram of the powder is shown in FIG. 7. Comparing X-ray powder diffraction diagrams of FIG. 7 and FIG. 1, it is recognized that the crystalline t-BN powder of FIG. 7 is crystallized to a greater extent than that of FIG. 1 and has sharp diffraction peaks at 26.7° and 41.8° in 2θ which sites correspond to the [002] and the [100] diffraction peaks of h-BN, respectively. However, the angle of the peak which corresponds to [002] diffraction peak of h-BN is a slightly shifted to the large angle side, and there is no diffraction peak at the site which corresponds to the [102] diffraction peak (at 50°) of h-BN. There is a sharp but medium height diffraction peak at 41.8° which corresponds to the site of [100] diffraction of h-BN. This diffraction peak has a shoulder and a rather long foot on the larger angle side (hereinafter referred to "[10] diffraction peak") where the [101] diffraction peak of h-BN appears. Namely, the [101] diffraction peak for t-BN is not present as clear one. This feature means that the crystalline t-BN powder is pure well crystallized crystalline t-BN of monophase and is an example of crystalline t-BN powder (with very fine primary particle super-submicron sizes in the order of 0.2 to 0.3 μm) of the present invention. The low background of the diffraction diagram indicates that the boron nitride powder is pure and well crystallized monophase crystalline t-BN. That is to say, in the diffraction diagrams of FIG. 2 and FIG. 7, there is no diffraction peaks attributed to that of $B_2O_3$.

It should be noted that modification obvious in the art may be done without departing the gist and scope of the present invention as disclosed herein and claimed herein below as appended.

What is claimed is:

1. A method for producing a crystalline turbostratic boron nitride, comprising:

providing a mixture of a substantially amorphous boron nitride and an alkali-borate fluxing agent, and crystallizing said amorphous boron nitride to said crystalline turbostratic boron nitride in the presence of an effective amount of said alkali-borate fluxing agent in a non-oxidizing atmosphere comprising an atmosphere within a vessel of a closed or quasi-closed state.

2. The method of claim 1, wherein said crystallizing is carried out by heating said mixture at a temperature of about 1500° C. or below for a time period until said amorphous boron nitride is substantially crystallized to said crystalline turbostratic boron nitride.

3. The method of claim 1, wherein said crystallizing is carried out at a temperature from 1200° C. to 1400° C.

4. The method of claim 1, wherein said alkali-borate comprises sodium borate and/or hydrate thereof.

5. The method of claim 1, wherein said alkali-borate in said mixture ranges from 0.01% to 20% by weight.

6. The method of claim 1, further comprising:

purifying the crystalline turbostratic boron nitride by washing with an aqueous cleaning liquid to remove impurities after forming the crystalline turbostratic boron nitride.

*7. A crystalline turbostratic boron nitride, wherein said crystalline turbostratic boron nitride has a (001) diffraction peak in an X-ray powder diffraction diagram with Cu Kα X-ray which corresponds to the [002] diffraction peak of hexagonal boron nitride,*

*said (001) diffraction peak having a dominant peak defined by two straight flank lines, and being located between 20 and 30 degrees of 2θ and rising from a substantially flat portion of said X-ray diffraction diagram; and*

*said crystalline turbostratic boron nitride exhibits a combined (10) diffraction peak in the X-ray powder diffraction diagram around the site of [100] and [101] diffraction peaks of hexagonal boron nitride,*

*said combined (10) diffraction peak having a peak at a site which corresponds to the site of [100] diffraction of hexagonal boron nitride and exhibiting substantially no recognizable diffraction peak which corresponds to the [101] diffraction peak of hexagonal boron nitride.*

*8. The crystalline turbostratic boron nitride as defined in claim 7, wherein said combined (10) diffraction peak has a shoulder and a sloped foot portion following the shoulder on a larger angle side of 2θ where the [101] diffraction peak of hexagonal boron nitride appears.*

*9. The crystalline turbostratic boron nitride as defined in claim 7, wherein said (001) diffraction peak is the (001) diffraction peak shown in FIG. 7 of Drawings, and said combined (10) diffraction peak is the (10) diffraction peak shown in FIG. 7 of Drawings.*

*10. The crystalline turbostratic boron nitride as defined in claim 7, wherein said crystalline turbostratic boron nitride has a primary particle size of approximately from 0.1 to 0.4 μm.*

*11. The crystalline turbostratic boron nitride as defined in claim 7, wherein said crystalline turbostratic boron nitride has a primary particle size in the order of 0.2 to 0.3 μm.*

*12. The crystalline turbostratic boron nitride as defined in claim 7, wherein said turbostratic boron nitride has an X-ray powder diffraction peak which corresponds to a [004] diffraction of hexagonal boron nitride having a half peak-height width of 0.6° or below in 2θ.*

*13. The crystalline turbostratic boron nitride as defined in claim 7, wherein said turbostratic boron nitride has an X-ray powder diffraction peak which corresponds to a [004] diffraction of hexagonal boron nitride having a half peak-height width of 0.5° or below in 2θ.*

*14. A crystalline turbostratic boron nitride, wherein said crystalline turbostratic boron nitride has a (001) diffraction peak in an X-ray powder diffraction diagram with Cu Kα X-ray which corresponds to the [002] diffraction peak of hexagonal boron nitride,*

*said (001) diffraction peak having a dominant peak defined by two straight flank lines, and being located between 20 and 30 degrees of 2θ and rising from a substantially flat portion of said X-ray diffraction diagram;*

*said crystalline turbostratic boron nitride exhibits a combined (10) diffraction peak in the X-ray powder diffraction diagram around the site of [100] and [101] diffraction peaks of hexagonal boron nitride,*

*said combined (10) diffraction peak having peak at a site which corresponds to the site of [100] diffraction of hexagonal boron nitride and exhibiting substantially no recognizable diffraction peak which corresponds to the [101] diffraction peak of hexagonal boron nitride; and*

*said turbostratic boron nitride comprises primary particles having a substantially spherical shape.*

*15. The crystalline turbostratic boron nitride as defined in claim 14, wherein said combined (10) diffraction peak has a shoulder and a sloped foot portion following the shoulder on a larger angle side of 2θ where the [101] diffraction peak of hexagonal boron nitride appears.*

*16. The crystalline turbostratic boron nitride as defined in claim 14, wherein said (001) diffraction peak is the (001) diffraction peak shown in FIG. 7 of Drawings, and said combined (10) diffraction peak is the (10) diffraction peak shown in FIG. 7 of Drawings.*

*17. The crystalline turbostratic boron nitride as defined in claim 14, wherein said crystalline turbostratic boron nitride has a primary particle size of approximately from 0.1 to 0.4 μm.*

*18. The crystalline turbostratic boron nitride as defined in claim 14, wherein said primary particles have a size in the order of 0.2 to 0.3 μm.*

*19. The crystalline turbostratic boron nitride as defined in claim 14, wherein said turbostratic boron nitride has an X-ray powder diffraction peak which corresponds to a [004] diffraction of hexagonal boron nitride having a half peak-height width of 0.6° or below in 2θ.*

*20. The crystalline turbostratic boron nitride as defined in claim 14, wherein said turbostratic boron nitride has an X-ray powder diffraction peak which corresponds to a [004] diffraction of hexagonal boron nitride having a half peak-height width of 0.5° or below in 2θ.*

* * * * *